(12) United States Patent
Przygodda

(10) Patent No.: US 8,116,185 B2
(45) Date of Patent: Feb. 14, 2012

(54) HOLOGRAPHIC STORAGE MEDIUM WITH INTEGRATED PHASE MASK

(75) Inventor: Frank Przygodda, Villingen-Schwenningen (DE)

(73) Assignee: Thomson Licensing, Boulogne-Billancourt (FR)

( * ) Notice: Subject to any disclaimer, the term of this patent is extended or adjusted under 35 U.S.C. 154(b) by 212 days.

(21) Appl. No.: 12/214,531

(22) Filed: Jun. 19, 2008

(65) Prior Publication Data

US 2009/0010134 A1 Jan. 8, 2009

(30) Foreign Application Priority Data

Jul. 2, 2007 (EP) .................................. 07111511

(51) Int. Cl.
*G11B 7/00* (2006.01)
(52) U.S. Cl. .................... 369/103; 369/284; 369/285
(58) Field of Classification Search .................. None
See application file for complete search history.

(56) References Cited

U.S. PATENT DOCUMENTS

| 6,844,949 B2 * | 1/2005 | Kim ................................ 359/35 |
| 2005/0286386 A1 | 12/2005 | Edwards et al. |
| 2006/0280095 A1 | 12/2006 | Tsukagoshi et al. |

FOREIGN PATENT DOCUMENTS

WO  WO 03/044574 A  5/2003

OTHER PUBLICATIONS

Search Report Nov. 28, 2007.
Bunsen M; Okamoto A: Proceedings of the SPIE, vol. 5362, Jan. 27, 2004, Jan. 28, 2004 pp. 128-135, XP002460161 *the whole document*.

* cited by examiner

*Primary Examiner* — Joseph Haley
(74) *Attorney, Agent, or Firm* — Robert D. Shedd; Harvey D. Fried; James McKenzie

(57) ABSTRACT

A holographic storage medium is proposed, and more specifically a holographic storage medium with an integrated phase mask layer. The holographic storage medium has a phase mask layer on top of a holographic storage layer, wherein the phase mask layer has one or more phase pattern areas for coupling-in a reference beam and imprinting a phase pattern on the reference beam, and one or more neutral areas for coupling-in an object beam and/or coupling-out a reconstructed object beam.

8 Claims, 4 Drawing Sheets

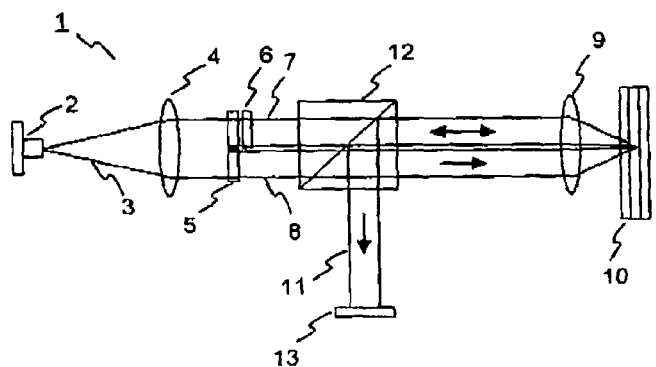
Fig. 1
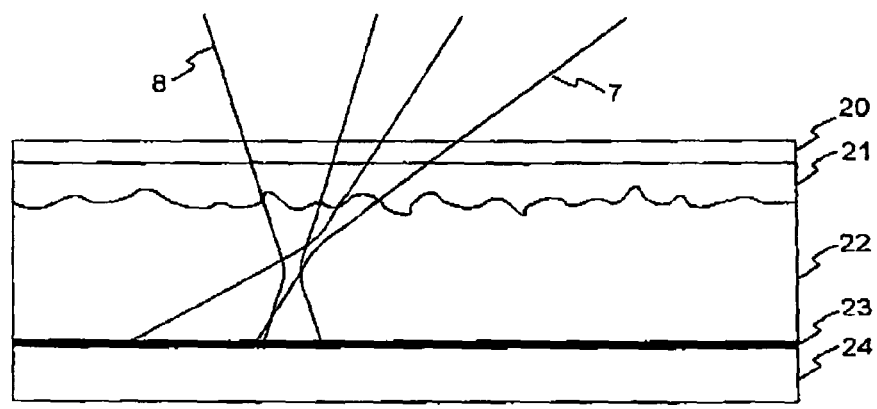
Fig. 2 - Prior Art

HOLOGRAPHIC STORAGE MEDIUM WITH INTEGRATED PHASE MASK

This application claims the benefit, under 35 U.S.C. §119, of European Patent Application No. 07111511.7 filed Jul. 2, 2007.

FIELD OF THE INVENTION

The present invention relates to a holographic storage medium, and more specifically to a holographic storage medium with an integrated phase mask suitable for correlation or speckle multiplexing.

BACKGROUND OF THE INVENTION

One concept for increasing the capacity of optical storage media is to use holographic data storage. In this case the surface or the whole volume of the holographic storage medium is used for storing information, not just a few layers as for conventional optical storage media. Furthermore data can be stored as data pages. Typically a data page consists of a matrix of light-dark-patterns, which code multiple bits. This allows to achieve increased data rates in addition to the increased storage density. One further advantage of holographic data storage is the possibility to store multiple data in the same volume, e.g. by changing the angle between the two beams or by using shift multiplexing, etc.

In holographic data storage digital data are stored by recording the interference pattern produced by the superposition of two coherent laser beams, where one beam, the so-called 'object beam', is modulated by a spatial light modulator and carries the information to be recorded in the form of the data pages. The second beam serves as a reference beam. The interference pattern leads to modifications of specific properties of the storage material, which depend on the local intensity of the interference pattern. Reading of a recorded hologram is performed by illuminating the hologram with the reference beam using the same conditions as during recording. This results in the reconstruction of the recorded object beam.

The performance of a holographic data storage system can be improved by implementing a phase mask in the optical setup. Such a phase mask introduces random or pseudo random phase shifts to the reference beam and/or the object beam, which results in a better shift selectivity of the system. In addition, high beam intensities inside the holographic storage medium are avoided as the focus diameter of a focused beam is expanded. This technique is known as correlation multiplexing or speckle multiplexing. One disadvantage of this method is that a phase mask with exactly the same pattern must be implemented in all compatible holographic data storage systems to enable readout of a holographic storage medium which was written with another system. The reason is a general aspect of holography: The reference beam for readout (also called probe beam) must have the same properties as the reference beam used during writing. This includes the phase distribution of the reference beam.

To circumvent the above disadvantage, a hologram multiplexing method with a speckled reference beam generated by the photorefractive beam-fanning effect has been proposed by M. Bunsen et al.: "Hologram multiplexing method with photorefractive beam-fanning speckle", Advanced Optical and Quantum Memories and Computing, Proc. of the SPIE, Vol. 5362 (2004), pp. 128-135. In this method, a bulk photorefractive crystal takes the role of generating various speckle fields as well as storing holograms. The speckle field of a reference beam used for holographic recording is generated by the photorefractive beam-fanning effect in the storage crystal itself. A special alignment of the crystal axes relative to the reference beam and the object beam is needed to ensure generation of speckle fields for the reference beam while avoiding a excessively large beam-fanning effect of the object beam.

SUMMARY OF THE INVENTION

It is an object of the invention to propose a holographic storage medium with an integrated phase mask, which has a reduced influence on the object beam.

According to the invention, this object is achieved by a holographic storage medium with a phase mask layer on top of a holographic storage layer, the phase mask layer having one or more phase pattern areas for coupling-in a reference beam and imprinting a phase pattern on the reference beam, and one or more neutral areas for coupling-in an object beam and/or coupling-out a reconstructed object beam. By integrating the phase mask only in specific locations of the holographic storage medium the advantages of the correlation/speckle multiplexing remain unaffected. Exactly the same phase mask is in the optical path if the holographic storage medium is passed to another holographic storage system. No special phase mask with defined properties has to be implemented in the holographic storage systems any more. Also, the phase masks in different holographic storage media do not need to be exactly the same, just the general parameters have to be the same. With other words, not the exact pattern, but the amount of phase variances and the spatial size of the variations has to be the same. At the same time, the phase masks do only influence the reference beam. The object beam, and hence also the reconstructed object beam, remains unaffected. This greatly improves the image quality of the reconstructed object beam, which simplifies data retrieval.

Advantageously, the phase pattern areas of the phase mask layer are realized by a rough surface of the medium. This constitutes a very efficient solution, as a rough surface can be easily produced. Preferably, the rough surface is covered by a protection layer. This prevents any alterations of the surface structure, which could otherwise lead to problems during subsequent readout. The materials of the phase mask laser and the protection layer need to have different diffraction indices in order to effect the desired diffraction of the beam, i.e. the desired deformation of its wavefront.

Preferably, the phase pattern areas are arranged above an area of the holographic storage layer where holograms are recorded. This arrangement is especially suitable if the optical axis of the reference beam is perpendicular to the surface of the holographic storage medium. In this case the optical axis of the object beam or a reconstructed object beam is inclined with regard to the surface. Alternatively, the phase pattern areas are arranged beside an area of the holographic storage layer where holograms are recorded. This arrangement is especially suitable if the optical axis of the reference beam is inclined with regard to the surface of the holographic storage medium. In this case the optical axis of the object beam or a reconstructed object beam is favorably perpendicular to the surface.

According to one aspect of the invention, the holographic storage medium is a disk-shaped storage medium. Disk-shaped holographic storage media offer the advantage that they may be used in holographic storage devices that are also capable of playback or recording of current optical storage media, such as Compact Disk, Digital Versatile Disk, BluRay Disk etc. In this case the phase pattern areas are concentric rings or a spiral. They may likewise consist of a plurality of individual phase pattern areas arranged in concentric rings or a spiral. The individual areas are circular or rectangular areas, for example. Of course, it is likewise within the scope of the invention to arrange the neutral areas as concentric rings or a spiral, or as a plurality of individual neutral areas arranged in concentric rings or a spiral.

According to another aspect of the invention the holographic storage medium is a card-shaped storage medium. In this case the phase pattern areas are lines or a plurality of individual phase pattern areas arranged in lines. As above, it is likewise possible to arrange the neutral areas as lines, or as a plurality of individual neutral areas arranged in lines.

Preferably, in an apparatus for reading and/or recording a holographic storage medium according to the invention, a reference beam generated by a light source is arranged inclined with respect to the optical path of an object beam or a reconstructed object beam such that the reference beam impinges on phase pattern areas of the phase mask layer and the object beam or a reconstructed object beam impinges on neutral areas of the phase mask layer. The relative inclination of the optical axes makes it possible to transmit the reference beam and the object beam or a reconstructed object beam through different areas of the phase mask layer.

BRIEF DESCRIPTION OF THE DRAWINGS

For a better understanding the invention shall now be explained in more detail in the following description with reference to the figures. It is understood that the invention is not limited to this exemplary embodiment and that specified features can also expediently be combined and/or modified without departing from the scope of the present invention. In the figures:

FIG. 1 schematically depicts a holographic storage system,

FIG. 2 illustrates the cross-section of a prior art holographic storage medium,

DETAILED DESCRIPTION OF PREFERRED EMBODIMENTS

Figure 3:
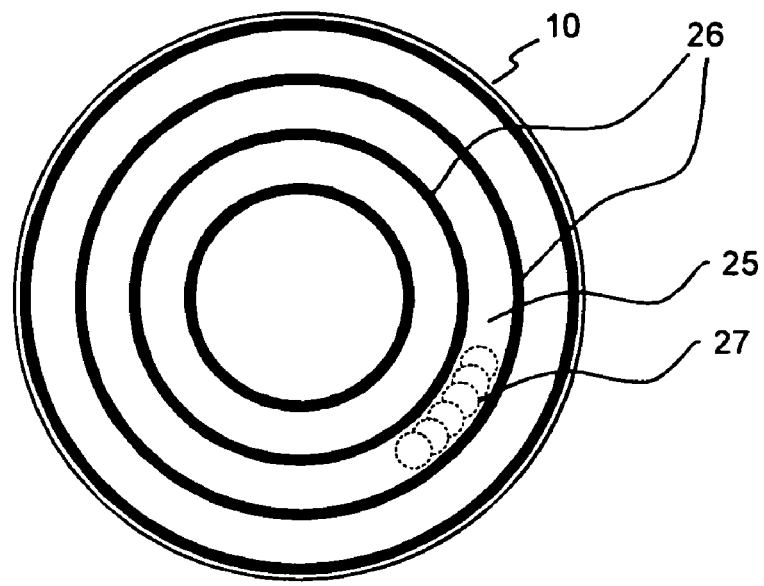
FIG. 3 depicts a top view of a first embodiment of a holographic storage medium according to the invention.

In holographic data storage digital data are stored by recording the interference pattern produced by the superposition of two coherent laser beams. An exemplary setup of a holographic storage system 1 is shown in FIG. 1. A source of coherent light, e.g. a laser diode 2, emits a light beam 3, which is collimated by a collimating lens 4. The light beam 3 is then divided into two separate light beams 7, 8. In the example the division of the light beam 3 is achieved using a first beam splitter 5. However, it is likewise possible to use other optical components for this purpose. A spatial light modulator (SLM) 6 modulates one of the two beams, the object beam 7, to imprint a 2-dimensional data pattern. Both the object beam 7 and the further beam, the reference beam 8, are focused into a holographic storage medium 10, e.g. a holographic disk or card, by an objective lens 9. At the intersection of the object beam 7 and the reference beam 8 an interference pattern appears, which is recorded in a photo-sensitive layer of the holographic storage medium 10.

The stored data are retrieved from the holographic storage medium 10 by illuminating a recorded hologram with the reference beam 8 only. The reference beam 8 is diffracted by the hologram structure and produces a copy of the original object beam 7, the reconstructed object beam 11. This reconstructed object beam 11 is collimated by the objective lens 9 and directed onto a 2-dimensional array detector 13, e.g. a CCD-array, by a second beam splitter 12. The array detector 13 allows to reconstruct the recorded data.

FIG. 2 depicts the cross-section of a prior art holographic storage medium 10. Also illustrated is the propagation of an object beam 7 and a reference beam 8. The holographic storage medium has a cover layer 20, a phase mask layer 21, a holographic storage material layer 22, a reflective layer 23, and a substrate 24. The phase pattern of the phase mask layer 21 is indicated by the irregular boundary to the holographic storage material layer 22. Both the object beam 7 and the reference beam 8 pass through the phase mask layer 21. As a consequence, their focus diameters are increased.

In the following the invention is explained with reference to a reflection type disk-shaped holographic storage medium 10. Of course, the invention is likewise applicable to a transmission type disk-shaped holographic storage medium 10 and to card-shaped holographic storage media.

In FIG. 3 a top view of a first embodiment of a disk-shaped holographic storage medium 10 according to the invention is shown. The holograms 27 are indicated by the dashed circles. They may be written along the writing direction in an overlapping manner using one or more suitable multiplexing methods, such as shift multiplexing or correlation multiplexing, in order to obtain a higher data density on the holographic storage medium 10. The holographic storage medium 10 includes a phase mask layer 21. The main area 25 of this phase mask layer 21, which corresponds to the hologram recording area, is provided with a phase pattern for imprinting phase variations onto the reference beam 8. However, situated beside the recording area of the holograms 27 are neutral areas 26, which do not carry a phase pattern and through which the object beam 7 passes. In the figure these areas 26 are indicated by concentric black circles. They may likewise consist of a plurality of small individual areas, e.g. one rectangular or circular area for each hologram 27. In addition, the neutral areas 26 can likewise form a spiral instead of concentric circles. The width of the neutral areas 26 is mainly determined by the diameter of the object beam 7. Of course, it is likewise possible to provide a plurality of small individual phase pattern areas 25 within a large neutral area 26. As before, the phase pattern of the phase mask layer 21 is indicated by the irregular boundary to the holographic storage material layer 22. This does not mean that this boundary is in fact irregular, though this constitutes one possible solution. It is likewise possible to provide the upper surface of the phase mask layer 21 with an irregular surface structure. A further alternative among others is to fabricate the phase pattern areas 25 of an inhomogeneous material.

Figure 4:
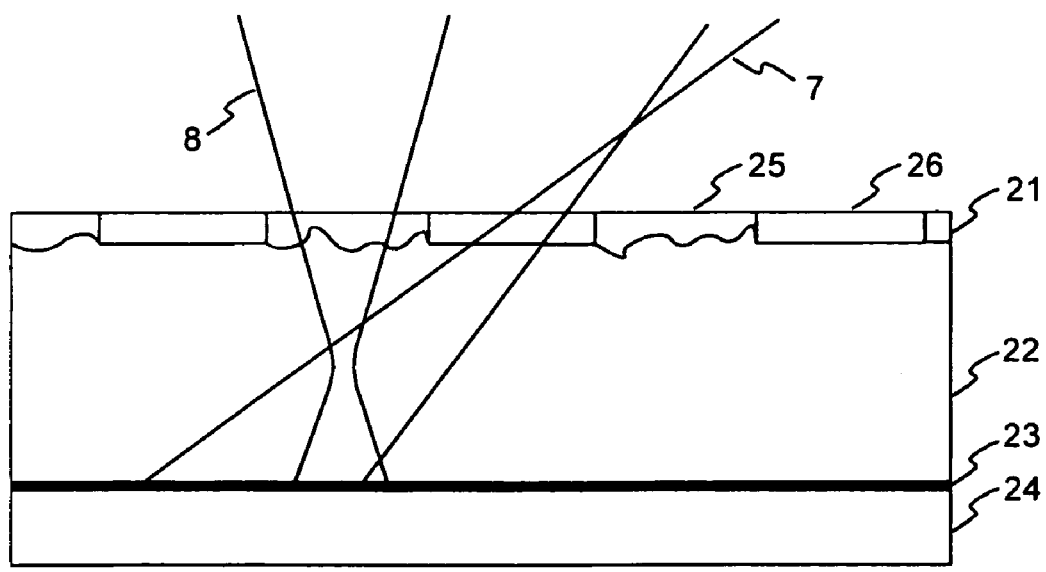
FIG. 4 illustrates the cross-section of the holographic storage medium of FIG. 3.

FIG. 4 illustrates the cross-section of the holographic storage medium 10 according to the first embodiment of the invention. In this embodiment the optical axis of the object beam 7 is inclined with respect to the surface of the holographic storage medium 10, while the optical axis of the reference beam 8 is perpendicular to the surface. As can be seen, only the reference beam 8 passes through a phase pattern area 25 of the phase mask layer 21, whereas the object beam 7 passes through a neutral area 26. Therefore, the object beam 7 is not influenced by the phase mask layer 21. In this example, the phase mask layer 21 also serves as a cover layer. Of course, a separate cover layer may be provided.

Figure 5:
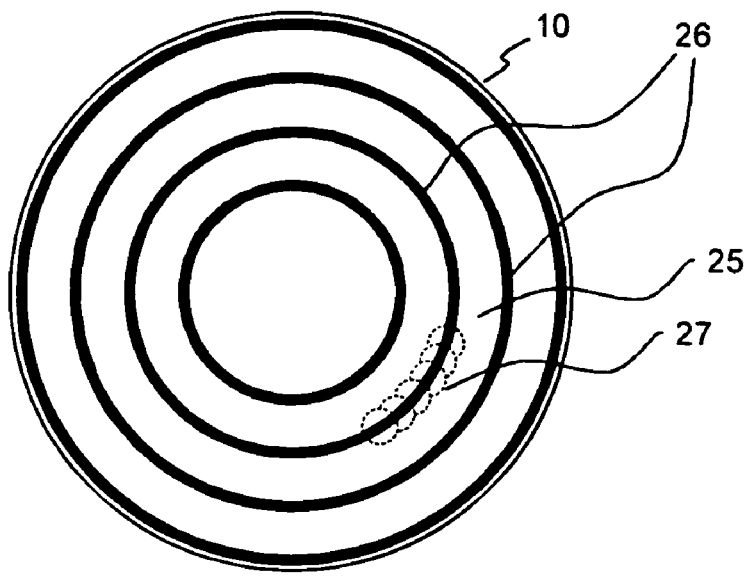
FIG. 5 depicts a top view of a second embodiment of a holographic storage medium according to the invention.

A top view of a second embodiment of a disk-shaped holographic storage medium 10 according to the invention is shown in FIG. 5. Contrary to the embodiment of FIG. 3, the neutral areas 26 of the phase mask layer 21 coincide with the hologram recording area, whereas the area 25 provided with a phase pattern is arranged beside the recording area of the holograms 27.

Figure 6:
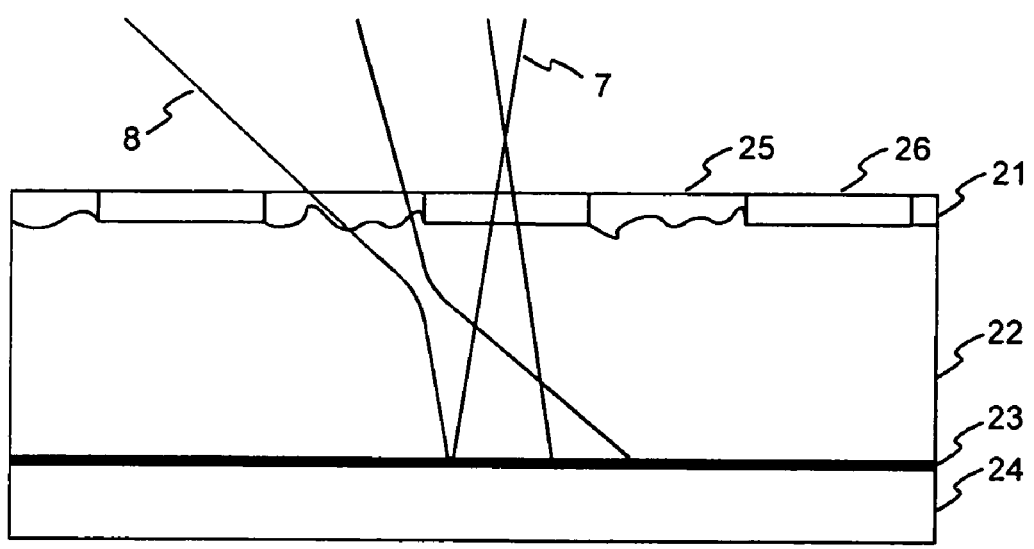
FIG. 6 illustrates the cross-section of the holographic storage medium of FIG. 5.

The cross-section of the holographic storage medium 10 of FIG. 5 is depicted in FIG. 6. In this example the optical axis of the object beam 7 is perpendicular to the surface of the holographic storage medium 10, while the optical axis of the reference beam 8 is inclined with respect to the surface. A further alternative is to use an inclined optical axis for both the object beam 7 and the reference beam 8 with a corresponding arrangement of the phase mask area 25 and the neutral areas 26.

Figure 7:
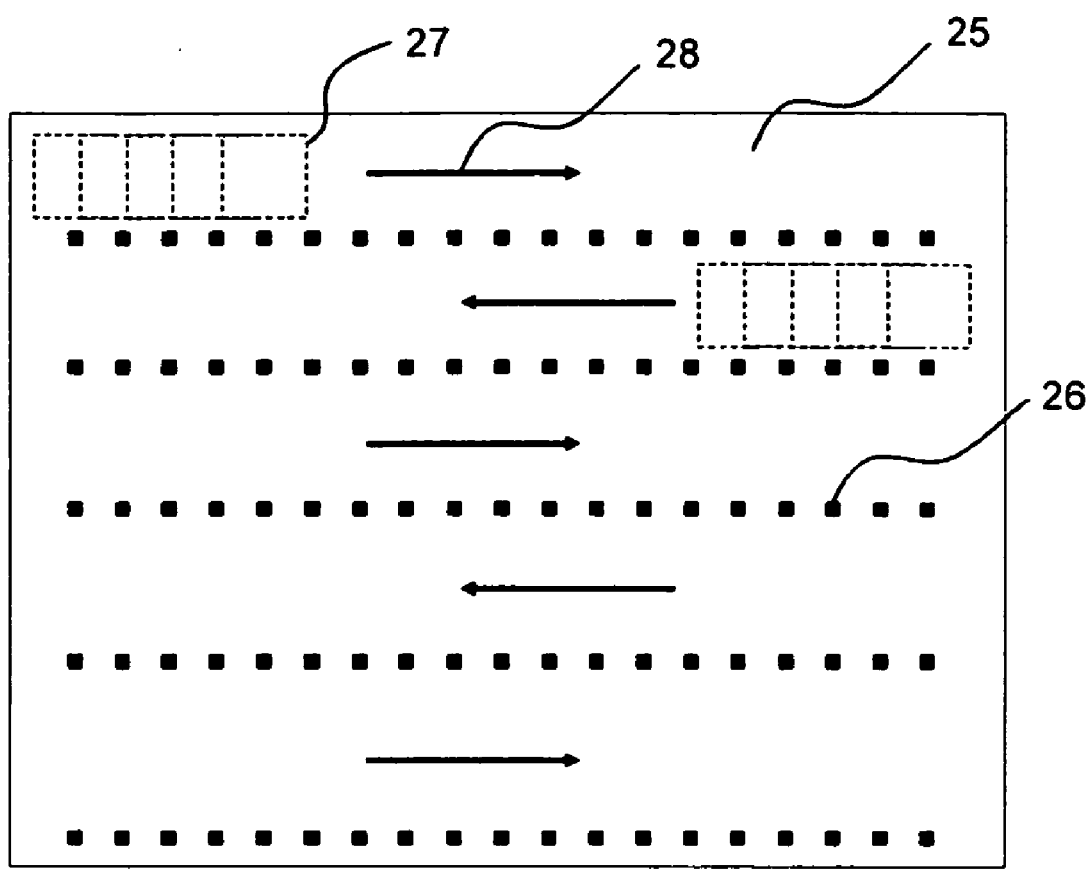
FIG. 7 shows a top view of a rectangular holographic storage medium according to the invention.

FIG. 7 depicts the top view of a rectangular holographic storage medium 10 according to the invention. The neutral areas are realized as rows of small rectangular areas 26. The neutral areas 26 of each row may likewise be combined to a single, continuous neutral area. The holograms 27, which are indicated by the overlapping dashed rectangles, are recorded in direction 28 along the transparent rectangles.

What is claimed, is:

1. A holographic storage medium with a phase mask layer on top of a holographic storage layer comprising holograms, the phase mask layer comprising one or more phase pattern areas for coupling-in a reference beam into the holographic storage layer, and one or more neutral areas, wherein the neutral areas and the phase pattern areas of phase mer are arranged such that that either a phase pattern area of phase mask layer is located above each hologram or a neutral area of the phase mask layer is located above each hologram.

2. The holographic storage medium according to claim 1, wherein the phase pattern areas are areas with a rough surface or areas consisting of an inhomogeneous material.

3. The holographic storage medium according to claim 1, further comprising a cover layer on top of the phase mask layer.

4. The holographic storage medium according to claim 1, wherein the holographic storage medium is a disk-shaped storage medium.

5. The holographic storage medium according to claim 4, wherein the phase pattern areas or the neutral areas are concentric rings or a spiral, or a plurality of individual phase pattern areas or neutral areas arranged in concentric rings or a spiral.

6. The holographic storage medium according to claim 1, wherein the holographic storage medium is a card-shaped storage medium.

7. The holographic storage medium according to claim 6, wherein the phase pattern areas or the neutral areas are lines or a plurality of individual phase pattern areas or neutral areas arranged in lines.

8. A system including a holographic storage medium with a phase mask layer on top of a holographic storage layer, wherein the phase mask layer comprises one or more phase pattern areas and one or more neutral areas, and an apparatus for reading from or writing to the holographic storage medium, comprising a light source for generating a reference beam, or for generating an object beam and a reference beam, wherein the reference beam is arranged inclined with respect to the optical path of the object beam or a reconstructed object beam such that the reference beam impinges on a phase pattern area of the phase mask layer and the object beam or the reconstructed object beam impinges on a neutral area of the phase mask layer.

* * * * *